(12) United States Patent
Shiki et al.

(10) Patent No.: US 9,663,301 B2
(45) Date of Patent: May 30, 2017

(54) CONVEYING-TRAVELING-BODY-UTILIZING CONVEYING DEVICE

(71) Applicant: Daifuku Co., Ltd., Osaka (JP)

(72) Inventors: Kiyoshi Shiki, Shiga (JP); Yoshifumi Yasuda, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/217,647

(22) Filed: Jul. 22, 2016

(65) Prior Publication Data

US 2017/0022014 A1    Jan. 26, 2017

(30) Foreign Application Priority Data

Jul. 23, 2015    (JP) ................................. 2015-145527

(51) Int. Cl.
*B65G 35/06* (2006.01)
*B61B 13/12* (2006.01)
*B65G 17/06* (2006.01)

(52) U.S. Cl.
CPC ............ *B65G 35/06* (2013.01); *B61B 13/127* (2013.01); *B65G 17/066* (2013.01)

(58) Field of Classification Search
CPC ...... B65G 17/066; B65G 17/30; B65G 35/06; B65G 35/08; B61B 13/127
See application file for complete search history.

(56) References Cited

U.S. PATENT DOCUMENTS

| 5,067,413 | A  | * | 11/1991 | Kiuchi ................. | B61B 13/127 104/168 |
| 7,658,275 | B2 | * | 2/2010 | Hayashi ............... | B61B 13/127 198/459.1 |
| 7,798,068 | B2 | * | 9/2010 | Nishihara .............. | B61B 3/02 104/172.4 |
| 8,408,381 | B2 | * | 4/2013 | Murakami ............ | B65G 35/06 198/465.1 |
| 9,394,021 | B2 | * | 7/2016 | Okazaki ................ | B62D 65/18 |

FOREIGN PATENT DOCUMENTS

JP          2006117079 A      5/2006

* cited by examiner

*Primary Examiner* — Gerald McClain
*Assistant Examiner* — Keith R Campbell
(74) *Attorney, Agent, or Firm* — St. Onge Steward Johnston & Reens LLC (57) ABSTRACT

A conveying-traveling-body-utilizing conveying device links conveying traveling bodies to each other where load bars are continuous to each other. A linked part is provided at one end of the load bar, and a linking hook is provided at the other end which can engage with and disengage from the linked part. The linking hook is pivotally supported and is vertically movable between a pre-engagement orientation separated upward from the linked part, with respect to an engaged orientation of covering the linked part from above, and a standby orientation tilted to a lowering limit from the engaged orientation by an urging force. When the linking hook is in the standby orientation, longitudinally adjacent conveying traveling bodies can approach each other to a connected state, where the respective load bars are abutted against each other, without the linking hook in the standby orientation and the linked part contacting each other.

4 Claims, 9 Drawing Sheets

CONVEYING-TRAVELING-BODY-UTILIZING CONVEYING DEVICE

FIELD OF THE INVENTION

The present invention relates to a conveying device that utilizes a friction-driven conveying traveling body.

BACKGROUND OF THE INVENTION

A conveying device that utilizes a friction-driven conveying traveling body includes a conveying traveling body, which includes a load bar for friction drive that is continuous across its total length, and a friction drive means, which is disposed at a travel path flank and drives the conveying traveling body to travel by a friction drive wheel in pressure contact with the load bar, and those of various configurations, using a wagon type conveying traveling body that supports a conveyed object at an upper side or a trolley type conveying traveling body that suspends a conveyed object at a lower side, etc., are known.

Generally with such a type of conveying device that utilizes a friction-driven conveying traveling body, friction drive wheels of the friction drive means are aligned at intervals substantially equal to the total length of the load bar along the travel path of the conveying traveling body to not only enable conveying traveling bodies to travel while maintaining an arbitrary interval but also enable, in a travel path region not equipped with the friction drive means, all conveying traveling bodies inside the travel path region to be driven by being pushed from the rear by a conveying traveling body sent into the travel path region by a friction drive means at an entrance of the travel path region. Further, a configuration, where each conveying traveling body is equipped with a linking means that enables longitudinally adjacent conveying traveling bodies to be linked to each other as necessary, is known, for example, by way of Japanese Published Unexamined Patent Application No. 2006-117079 (Patent Literature 1). The linking means described in Patent Literature 1 can be utilized, when the sending-in of a conveying traveling body into the region for rear-pushing drive cannot be performed, as a means by which a conveying traveling body remaining in the region for rear-pushing drive is towed and forcibly pulled out from the region for rear-pushing drive by a conveying traveling body sent out by a friction drive means at an exit side of the region. A configuration, where, by keeping the linking means in an unlinked state, respective conveying traveling bodies can be made to travel by friction drive in a condition where the load bars of longitudinally adjacent conveying traveling bodies are abutted against each other, as in a conventional conveying device without the above type of linking means, is also described in Patent Literature 1.

SUMMARY OF THE INVENTION

With the configuration described in Patent Literature 1, it is possible, in a state where the load bars of longitudinally adjacent conveying traveling bodies are abutted against each other, to make the conveying traveling bodies travel in a state of being linked to each other by the linking means as well as to keep the linking means in the unlinked state and make the conveying traveling bodies travel by making the load bar of the conveying traveling body at a rear side thrust and push the load bar of the conveying traveling body at a front side, and a configuration described in Patent Literature 1 for keeping the linking means in the unlinked state is such that a linking hook operating rail for keeping the linking hook in the unlinked state is juxtaposed across a total length of a region in which the linking means is to be kept in the unlinked state or the linking hook is configured so that it can be alternatively kept at one of either of the linked state and the unlinked state by an elastic force and a linking hook operating rail is juxtaposed to a location at which the linking hook is to be switched to the linked state or the unlinked state.

With the former configuration, not only is a linking hook operating rail of long length required but because an operated part at the linking hook side must be made to act continuously on the linking hook operating rail of long length, there are problems of noise generation, shortening of service life of the operated part at the linking hook side, etc., and with the latter configuration, not only is a complex and unstable switching mechanism required but there is also a possibility that actions will not be performed as predetermined due to a defect in movement of the unstable switching mechanism.

The present invention proposes a conveying-traveling-body-utilizing conveying device capable of solving the problems of the conventional art such as the above, and to describe by providing reference symbols in parentheses used in the description of embodiments below to facilitate understanding the relationship with the embodiments, the conveying-traveling-body-utilizing conveying device according to the present invention has a configuration where, in a conveying-traveling-body-utilizing conveying device including a conveying traveling body (1), which includes a load bar (7) for friction drive that is continuous across its total length, and a friction drive means (32), which is disposed at a travel path flank and drives the conveying traveling body (1) to travel by a friction drive wheel (31) in pressure contact with the load bar (7), with the conveying traveling body (1) being provided with a linking means, which links longitudinally adjacent conveying traveling bodies (1) to each other in a state where the respective load bars (7) are made continuous to each other, the linking means being constituted of a linked part (9), provided at one end among respective front and rear ends of the load bar (7), a linking hook (8), provided at the other end and capable of being engaged with and disengaged from the linked part (9) of another adjacent conveying traveling body (1), and an operated part (25) provided at the linking hook (8), and a linking hook operating rail (30), acting on the operated part (25) to switch the linking hook (8) between an engaged orientation and a non-engaged orientation with respect to the linked part (9), being disposed at a travel path side of the conveying travel body (1), the linking hook (8) is pivotally supported so as to be vertically movable between a pre-engagement orientation of being separated upward from the linked part (9) of the other adjacent conveying traveling body (1) with respect to the engaged orientation of covering the linked part (9) from above, and a standby orientation of being tilted to a lowering limit from the engaged orientation by an urging force, and, when the linking hook (8) is in the standby orientation, longitudinally adjacent conveying traveling bodies (1) are enabled to approach each other to a connected state, where the respective load bars (7) are abutted against each other, without the linking hook (8) in the standby orientation and the linked part (9) of the other adjacent conveying traveling body (1) contacting each other.

According to the above configuration of the present invention, although by linking longitudinally adjacent conveying traveling bodies by the linking means in the connected state where the respective load bars are abutted against each other, the linked plurality of conveying traveling bodies can be driven to travel integrally by friction drive and by switching the linking means to the unlinked state, the respective conveying traveling bodies can be made to travel by friction drive at arbitrary intervals, it is also possible, during friction drive of the respective conveying traveling bodies in the state where the linking means is switched to the unlinked state, to make the respective conveying traveling bodies be friction-driven in the connected state where the load bars of the respective conveying traveling bodies are abutted against each other in the same manner as when longitudinally adjacent conveying traveling bodies are linked by the linking means. That is, whereas with a configuration such that, when front and rear conveying traveling bodies are moved to approach each other with a linking hook being in an unlinked orientation, the linking hook in the unlinked orientation of one conveying traveling body and a linked part of the other conveying traveling body collide with each other and cause a pitch between the conveying traveling bodies to widen before load bars of the respective front and rear conveying traveling bodies become abutted against each other, an interval between friction drive wheels of friction drive means must be made shorter than the total length of the load bar and the number of friction drive wheels must be increased, with the configuration of the present invention, the connected state in which the load bars of the respective conveying traveling bodies are abutted against each other can be entered even in the state where the linking means is switched to the unlinked state as described above and therefore, as with a conveying device of a configuration without a linking means, the respective conveying traveling bodies can be friction driven in the connected state where the respective load bars are abutted against each other with the friction drive wheels being aligned at the same interval as the total length of the load bar.

As described above, the conveying device that utilizes the friction-driven conveying traveling body according to the present invention is capable of executing various conventionally well-known linked friction drive methods utilizing the linking means that links the conveying traveling bodies to each other and executing a non-linked friction drive method in the state where the conveying traveling bodies are not linked to each other by the linking means, and moreover is capable of performing, in the same manner as in the configuration described in Patent Literature 1 indicated above, friction drive in the connected state in which the load bars of the respective conveying traveling bodies are abutted against each other even with the non-linked friction drive method, and a greatest feature of the present invention lies in the point that in executing the non-linked friction drive method, a special means, for example, a linking hook operating rail of long length or an unstable switching mechanism with an operating rail switching the unstable switching mechanism or other dedicated means as a means for switching the linking hook to the unlinked orientation and holding it there for a fixed section is not required whatsoever as in the configuration described in Patent Literature 1 indicated above to switch the linking means to the unlinked state and holding it in that state and it suffices that the linking hook be set in the standby orientation of being tilted to the lowering limit by gravity (and obviously a downwardly acting spring may be used in combination) so that not only is implementation possible extremely inexpensively but the same conditions as a configuration not including a linking means can be realized reliably.

In implementing the present invention, by mounting, to an end part of the load bar (7) at which the linked part (9) is provided, an inverted L-shaped support member (28), constituted of a columnar part (28a), projecting upward from an upper surface of the load bar (7), and a horizontal support part (28b), extending from an upper end of the columnar part (28a) to the side at which the engaging counterpart linking hook (8) is present, making the linked part (9) project at a distal upper surface side of the horizontal support part (28b) of the inverted L-shaped support member (28), and configuring so that when, in the state where the linking hook (8) is in the standby orientation, longitudinally adjacent conveying traveling bodies (1) approach each other to the connected state where the respective load bars (7) are abutted against each other, a distal hook part (21) of the linking hook (8) in the standby orientation enters inside a space between the horizontal support part (28b) of the inverted L-shaped support member (28) and the load bar (7) positioned at a lower side thereof, the present invention can be implemented readily.

Also, it is practical for the linking hook (8) to be pivotally supported at its rear end part, with respect to the distal end with the hook part (21), in a vertically movable manner by a horizontal support shaft (23) at a columnar support member (22) erected on an upper surface of an end part of the load bar (7), the columnar support member (22) to be provided with a stopper part (22a, 22b) restricting a vertical movement range of the linking hook (8) to a range between the pre-engagement orientation and the standby orientation, and the linking hook (8) to be configured so as to be held in the standby orientation by gravity. Further, the linked part (9) of the linking means may be configured from a roller (29) that is pivotally supported in a rotatable manner by a vertical support shaft at a distal upper surface side of the horizontal support part (28b) of the inverted L-shaped support member (28) and the distal hook part (21) of the linking hook (8) may be configured by installing, at an inner side of a downward projection (8a), projecting downward from a distal end of the linking hook (8), a band plate (24) of right-left lateral direction with a lateral width wider than a diameter of the roller (29) so as to protrude to both right and left sides from the downward projection (8a).

DETAILED DESCRIPTION OF THE INVENTION

Figure 1:
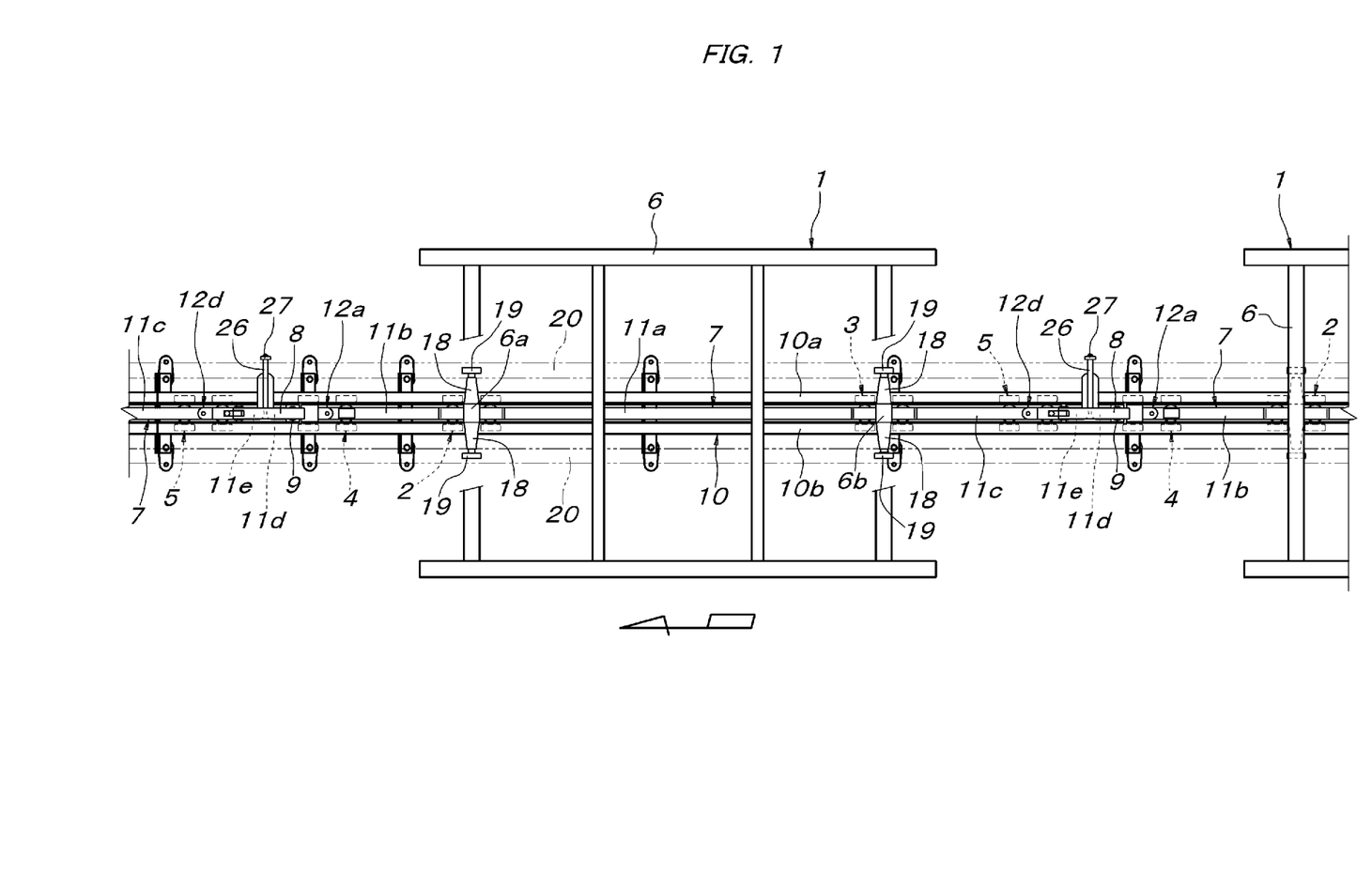
FIG. 1 is a partially cutaway plan view illustrating a conveying traveling bodies traveling in a mutually linked state.
Figure 2:
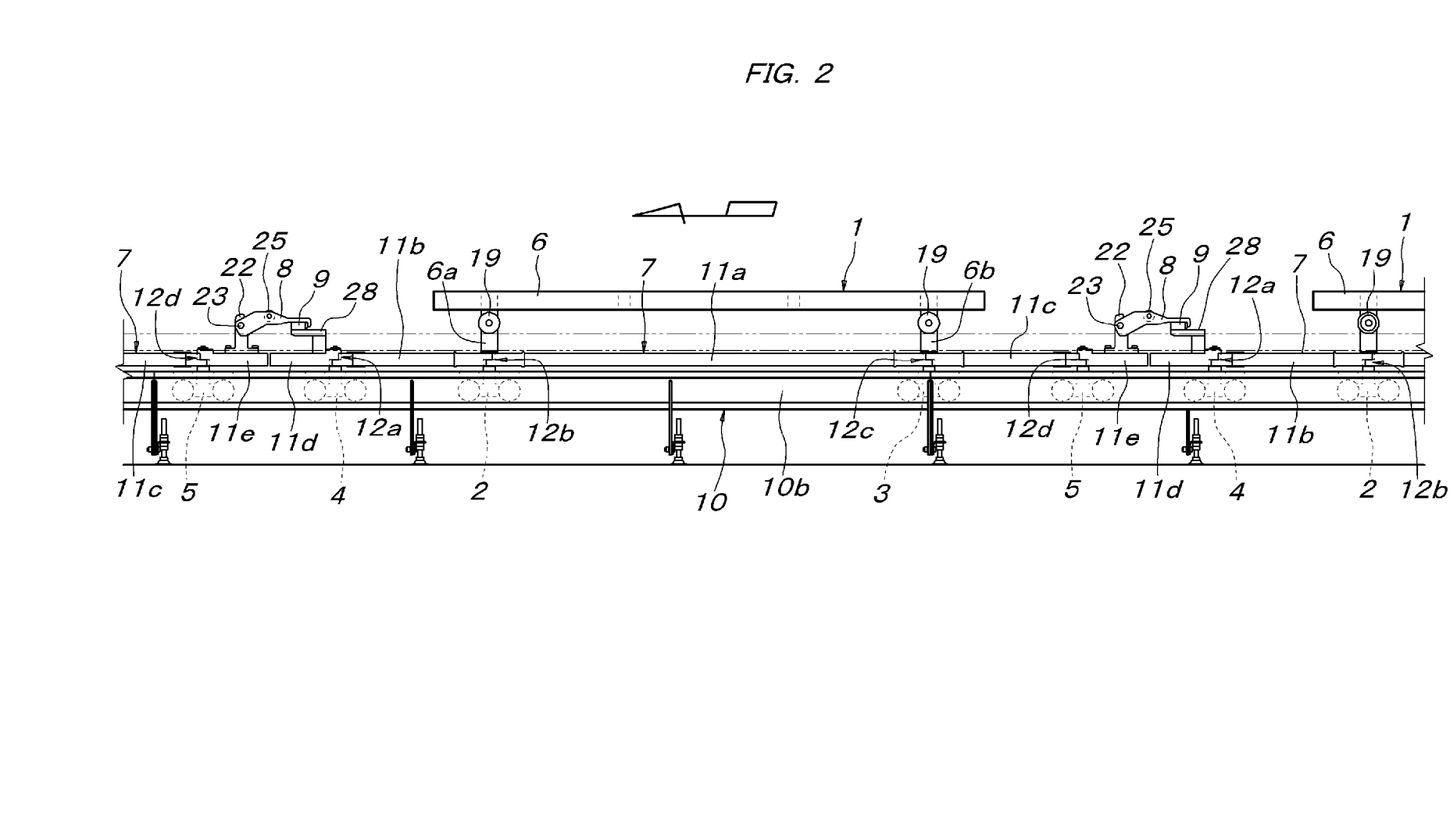
FIG. 2 is a side view of the same.
Figure 3:
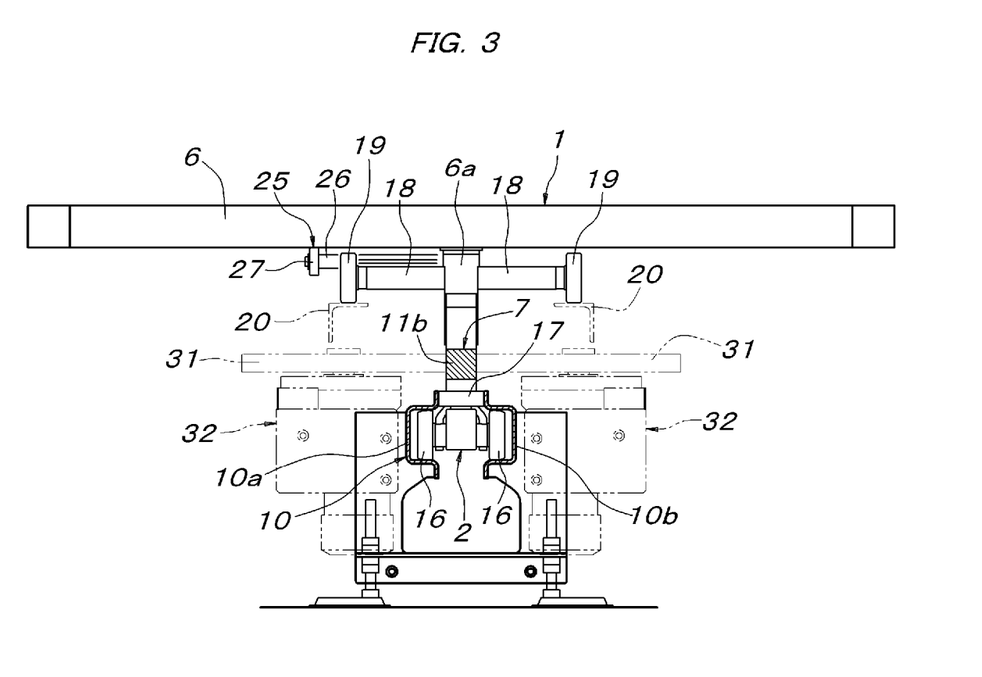
FIG. 3 is a longitudinal sectional front view of the same.

As shown in FIG. 1 to FIG. 3, a conveying traveling body 1 includes a workpiece support base 6, width direction central positions at respective front and rear ends of which are supported by a pair of front and rear load trolleys 2 and 3, a load bar 7 supported by the load trolleys 2 and 3 and front and rear guide trolleys 4 and 5, a linking hook 8, provided on a rear end part of the load bar 7, and a linked part 9, provided on a front end part of the load bar 7. Via the respective trolleys 2 to 5, the conveying traveling body 1 is supported, so as to be capable of travel, on a travel guide rail 10 laid along a travel path.

The load bar 7 has a total length longer than a total length of the workpiece support base 6 and is configured from a central load bar unit 11a, respective front and rear ends of which are supported by the load trolleys 2 and 3, a pair of front and rear connection load bar units 11b and 11c, each of which is shorter than the central load bar unit 11a and respective front and rear ends of which are supported by the load trolley 2 or 3 and the guide trolley 4 or 5, and respective end load bar units 11d and 11e, which are shorter than the connection load bar units 11b and 11c and an inner end part of each of which is cantilever-supported by the guide trolley 4 or 5.

Figure 4A:
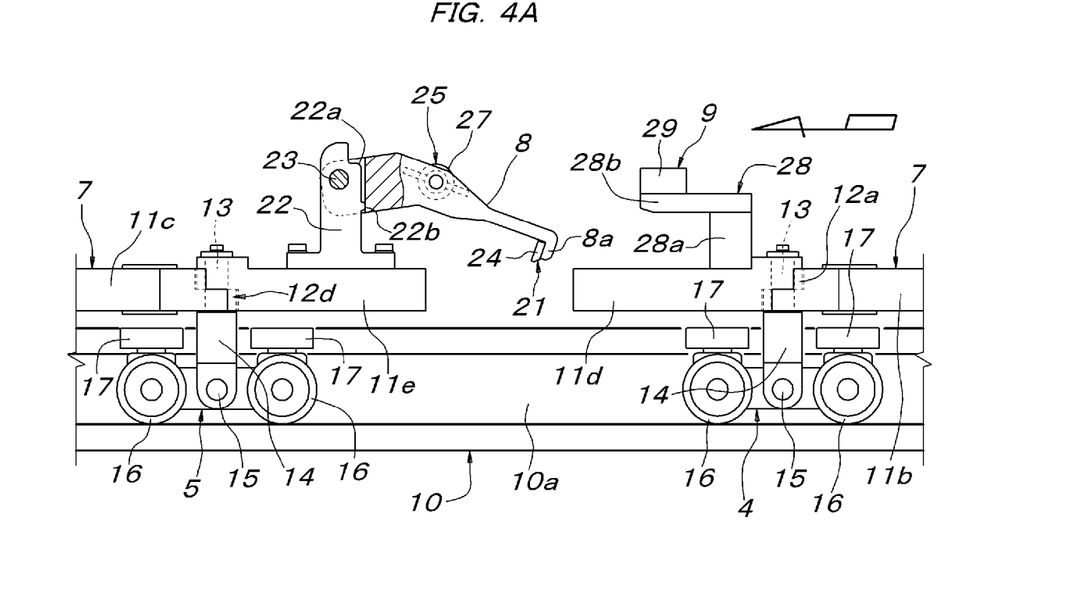
FIG. 4A is a partial longitudinal sectional side view of essential parts illustrating a state where a conveying traveling body at a rear side is traveling to approach a conveying traveling body at a front side in a state where a linking hook is in a standby orientation.
Figure 4B:
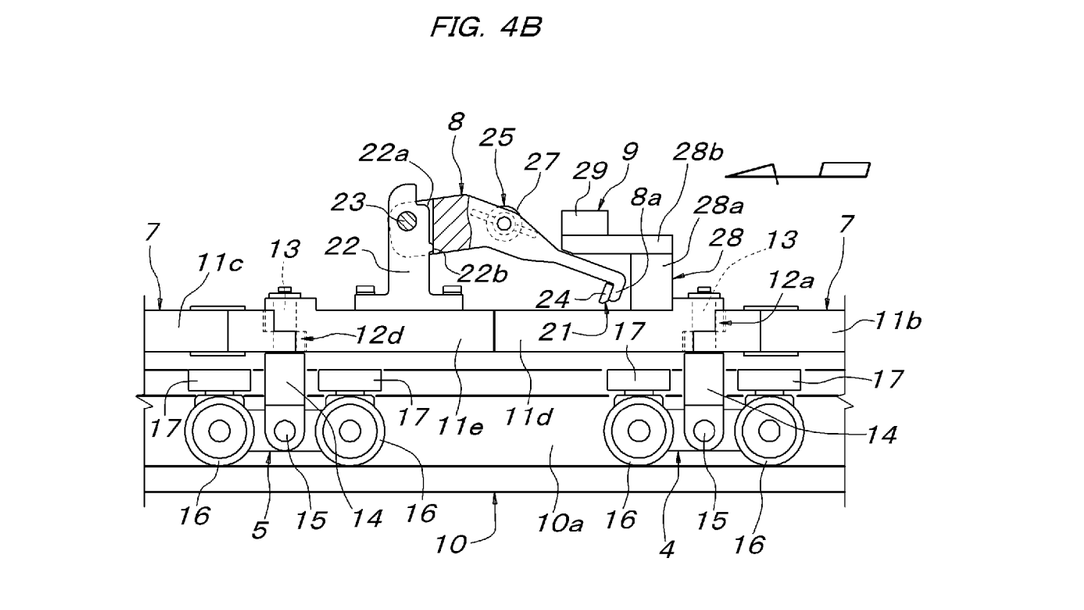
FIG. 4B is a partial longitudinal sectional side view illustrating a state where the conveying traveling body at the rear side is pushing the conveying traveling body at the front side from the rear is reached from the state shown in FIG. 4A.

Connection parts between the respective load bar units 11a to 11e are configured as joint parts 12a to 12d that are relatively swingable in horizontal directions around vertical shafts erected from the respective trolleys 2 to 5, and further, as shown in FIG. 4A and FIG. 4B, all trolleys 2 to 5 have a support member 14, supporting a vertical shaft 13 configuring each of the joint parts 12a to 12d and being pivotally supported so as to be swingable to the front and rear by a right-left lateral horizontal support shaft 15, and include, at both front and rear sides of the support member 14, a pair of right and left support wheels 16, respectively being fit in a right and left pair of channel rails 10a and 10b (see FIG. 3) configuring the travel guide rail 10, and positioning rollers 17, each fitted between upper side faces of the respective channel rails 10a and 10b and being rotatable around a vertical support shaft, and the respective end load bar units 11d and 11e are fixed via the vertical shafts 13 to the guide trolleys 4 and 5 and configured to constantly maintain an orientation parallel to the travel guide rail 10. By the above configuration, the conveying traveling body 1 is enabled to travel without problem at a horizontal curved path part or an elevating or descending path part of the travel guide rail 10.

The workpiece support base 6 is supported at upper end parts of the vertical shafts 13 of the joint parts 12b and 12c included in the load trolleys 2 and 3, horizontal arms 18 extending to both right and left sides are protruded at a pair of front and rear vertical column parts 6a and 6b at the side of the workpiece support base 6 coupled to the vertical shafts 13, and vertical motion suppression rollers 19 are pivotally supported by right-left lateral horizontal support shafts at outer ends of each horizontal arm 18. A pair of right and left swing prevention guide rails 20, rollably supporting the vertical motion suppression rollers 19 to support the workpiece support base 6 in a horizontal orientation, are laid along a work line, along which work is performed on a workpiece loaded on the workpiece support base 6.

Figure 5:
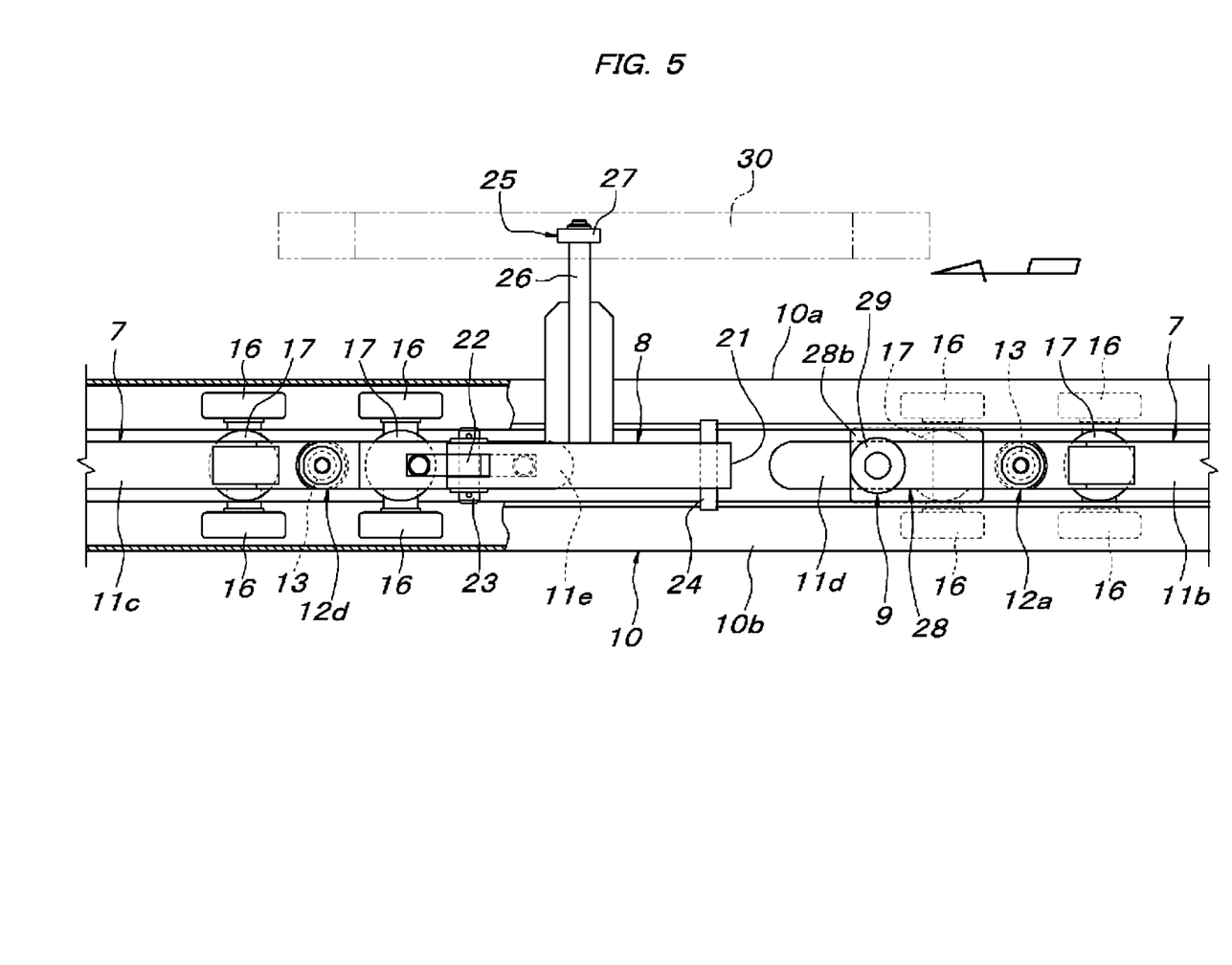
FIG. 5 is a partially cutaway plan view illustrating the state of FIG. 4A.

Next, to describe, based on FIG. 4A to FIG. 5, a specific structure of a linking means constituted of the linking hook 8 and the linked part 9, the linking hook 8 has a lateral width approximately equal to a lateral width of the load bar 7 and a rear end part with respect to a distal hook part 21 thereof is formed to a bifurcated shape. On the other hand, a columnar support member 22 is mounted to an upper surface of the load bar unit 11e positioned at a rear end of the load bar 7 and an upper end part of the columnar support member 22 and the rear-end bifurcated part of the linking hook 8 fitted externally thereto are linked by a right-left lateral horizontal support shaft 23 and the linking hook 8 is configured to be vertically swingable around the horizontal support shaft 23. The columnar support member 22 is provided with stopper parts 22a and 22b that restrict a vertical movement range of the linking hook 8, and the linking hook 8 is configured to be held by gravity in a standby orientation in which it is received and retained by the lower stopper part 22b.

When the linking hook 8 is in the standby orientation, the linking hook 8 is inclined obliquely rearward and downward from the position of the horizontal support shaft 23 and extends further to the rear than the rear end of the load bar 7 (rear end of the load bar unit 11e) and the distal hook part 21 is at a position slightly higher than an upper surface height of the load bar 7. The distal hook part 21 of the linking hook 8 is configured by installing, at an inner side of a downward projection 8a, projecting downward from a distal end of the linking hook 8, a band plate 24 of right-left lateral direction with a lateral width wider than the linking hook 8 so as to protrude to both right and left sides from the downward projection 8a. When the linking hook 8 is moved upward against gravity around the horizontal support shaft 23 and made to contact the upper stopper part 22a of the columnar support member 22, the linking hook 8 is put in a pre-engagement orientation of inclining obliquely rearward and upward from the position of the horizontal support shaft 23, and an orientation, between the pre-engagement orientation and the standby orientation, of extending substantially horizontally rearward from the position of the horizontal support shaft 23 is an engaged orientation of being engaged with the linked part 9.

Also, the linking hook 8 is provided with an operated part 25 for moving the linking hook 8 upward from the standby orientation to the pre-engagement orientation. As shown in FIG. 4A to FIG. 5, the operated part 25 is configured by a roller 27 that is pivotally supported rotatably by a right-left lateral horizontal support shaft at a distal end of a horizontal arm 26 fixed to and projected in a lateral direction from a side surface at an intermediate position in a length direction of the linking hook 8.

An inverted L-shaped support member 28, constituted of a columnar part 28a, projecting upward from an inner end part adjacent to the joint part 12a, and a horizontal support part 28b, extending horizontally toward the front from an upper end of the columnar part 28a, is mounted to an upper surface of the load bar unit 11d at a front end of the load bar 7, a roller 29 is pivotally supported rotatably by a vertical support shaft at a distal upper surface of the horizontal support part 28b of the inverted L-shaped support member 28, and the linked part 9 is configured by the roller 29.

The conveying traveling body 1 configured as described above may be used as follows. That is, unless operated in particular, the linking hook 8 at a rear end of the conveying traveling body 1 is constantly stable in the standby orientation of inclining obliquely rearward and downward due to gravity as shown in FIG. 4A and FIG. 4B. The linking hook 8 in the standby orientation is at the position higher than the upper surface height of the load bar 7 as shown in FIG. 4A and therefore, when, with respect to the conveying traveling body 1 with the linking hook 8 thus being in the standby orientation, a conveying traveling body 1 is moved on the travel guide rail 10 so as to approach from the rear, a front end part of the load bar 7 of the conveying traveling body 1 at the rear side, that is, the front end load bar unit 11d that includes the linked part 9 can pass a lower side of the linking hook 8 in the standby orientation of the conveying traveling body 1 at the front side and move to a position at which the front end of the load bar 7 of the conveying traveling body 1 at the rear side contacts the rear end of the load bar 7 of the conveying traveling body 1 at the front side as shown in FIG. 4B. At this point, the linking hook 8 in the standby orientation of the conveying traveling body 1 at the front side enters inside a space between the horizontal support part 25b of the inverted L-shaped support member 25 of the conveying traveling body 1 at the rear side and the upper surface of the load bar 7 (upper surface of the load bar unit 11d at the front end) of the conveying traveling body 1 at the rear side. Respective conveying traveling bodies 1 on the travel guide rail 10 can thus be aligned in a connected state where the ends of the respective load bars 7 are abutted against each other in the same manner as with conveying traveling bodies not having a linking means constituted of the linking hook 8 and the linked part 9.

Figure 6A:
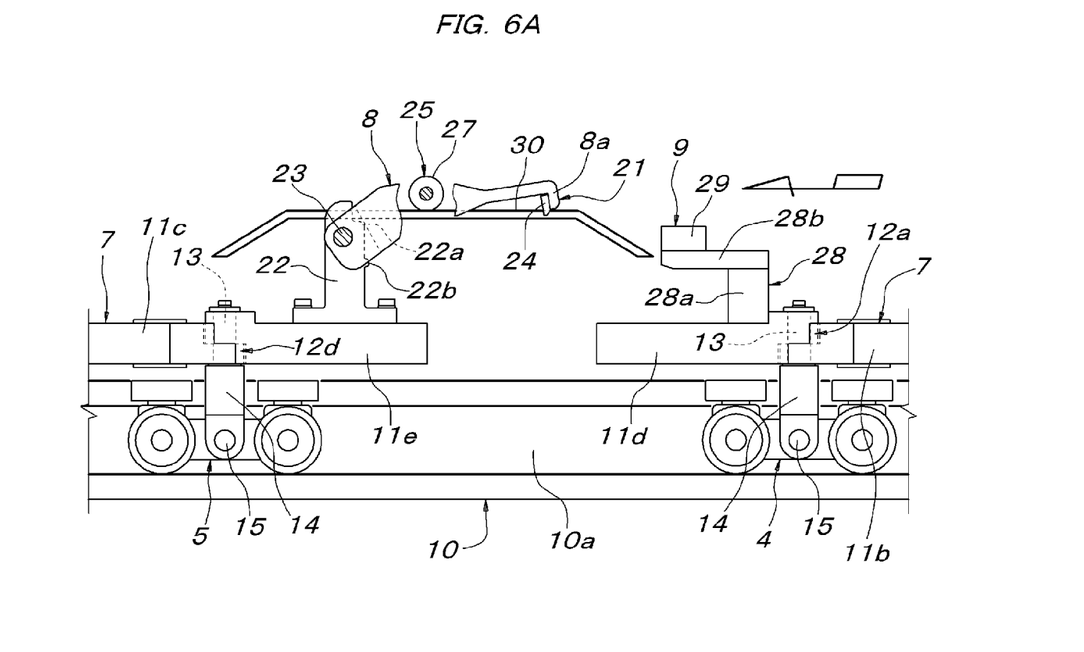
FIG. 6A is a partially cutaway side view of essential parts illustrating a first stage in linking conveying traveling bodies to each other by a linking means.
Figure 6B:
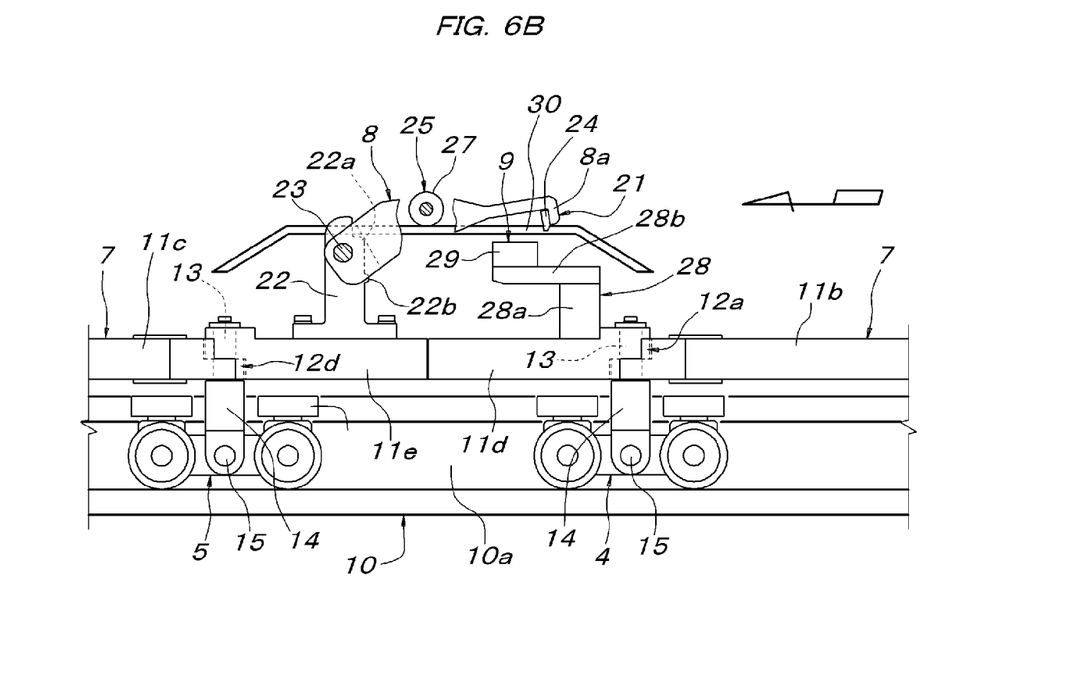
FIG. 6B is a partially cutaway side view of essential parts illustrating a second stage of the same.

When the conveying traveling body 1 at the front side and the conveying traveling body 1 at the rear side are to be linked by the linking means constituted of the linking hook 8 and linked part 9, a linking hook operating rail 30, for switching the linking hook 8 in the standby orientation shown in FIG. 4A and FIG. 4B, to the pre-engagement orientation shown in FIG. 6A and FIG. 6B, is laid at a travel path flank at the position of the linking work. The linking hook operating rail 30 lifts up the operated part 25 (roller 27), projected to one side of the linking hook 8, in accompaniment with forward travel of the conveying traveling body 1 to switch the linking hook 8 from the standby orientation to the pre-engagement orientation of contacting the upper stopper part 22a of the columnar support member 22. When the operated part 25 (roller 27) of the linking hook 8 thus rides on the linking hook operating rail 30 and the linking hook 8 is switched to the pre-engagement orientation, the conveying traveling body 1 is stopped and put on standby at that position. As shown in FIG. 6A and FIG. 6B, the linking hook 8 in the pre-engagement orientation is configured so that the distal hook part 21 thereof is at a position higher than an upper surface height of the linked part 9 (roller 29) at the front end side of the conveying traveling body 1.

Figure 7:
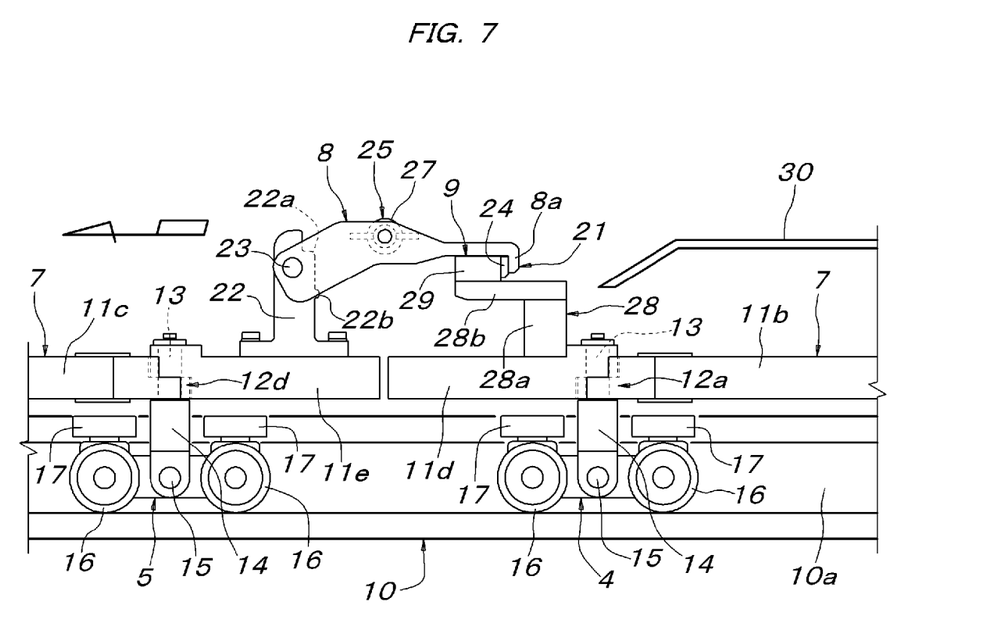
FIG. 7 is a partially cutaway side view of essential parts illustrating a state where conveying traveling bodies travel while being linked to each other.

As described above, with respect to the conveying traveling body 1 at the front side that is stopped in the state where the linking hook 8 is switched to the pre-engagement orientation, the conveying traveling body 1 at the rear side is made to travel on the travel guide rail 10 to approach from the rear. Consequently, as shown in FIG. 6A and FIG. 6B, the linked part 9 (roller 29) on the front end part of the load bar 7 of the conveying traveling body 1 at the rear side enters a lower side of the linking hook 8 in the pre-engagement orientation on the rear end part of the load bar 7 of the stopped conveying traveling body 1 at the front side so that the front end of the load bar 7 of the conveying traveling body 1 at the rear side can contact the rear end of the load bar 7 of the stopped conveying traveling body 1 at the front side. In this state, by friction-driving both the front and rear conveying traveling bodies 1 to travel forward integrally or by making the conveying traveling body 1 at the front side travel forward in a state where the rear end of the load bar 7 of the conveying traveling body 1 at the front side is thrusted and pushed by the front end of the load bar 7 of the conveying traveling body 1 at the rear side that is traveling forward, the operated part 25 (roller 27) of the linking hook 8 on the linking hook operating rail 30 is detached forward from being on the linking hook operating rail 30, and the linking hook 8 of the conveying traveling body 1 at the front side that was in the pre-engagement orientation swings downward due to gravity and is switched, as shown in FIG. 7, to an engaged orientation of covering the linked part 9 (roller 29) of the conveying traveling body 1 at the rear side that has entered the lower side.

When the linking hook 8 at the rear end of the conveying traveling body 1 at the front side is switched from the pre-engagement orientation to the engaged orientation and engages with the linked part 9 (roller 29) at the front end of the conveying traveling body 1 at the rear side as described above, the band plate 24 of the distal hook part 21 of the linking hook 8 becomes positioned immediately to the rear of the linked part 9 (roller 29) at the front end of the conveying traveling body 1 at the rear side and both the front and rear conveying traveling bodies 1 thus enter the state of being linked by the linking means constituted of the linking hook 8 and the linked part 9 so that by driving the conveying traveling body 1 at the front side to travel forward, the conveying traveling body 1 at the rear side can be towed and made to travel forward integrally. Obviously, it is also possible to drive the conveying traveling body 1 at the rear side to travel forward and make the conveying traveling body 1 at the front side to travel forward by being thrusted and pushed via the load bar 7. In this case, a gap forms between the band plate 24 of the distal hook part 21 of the linking hook 8 and the linked part 9 (roller 29) and a load does not act on the linking hook 8 and the linked part 9.

Figure 8A:
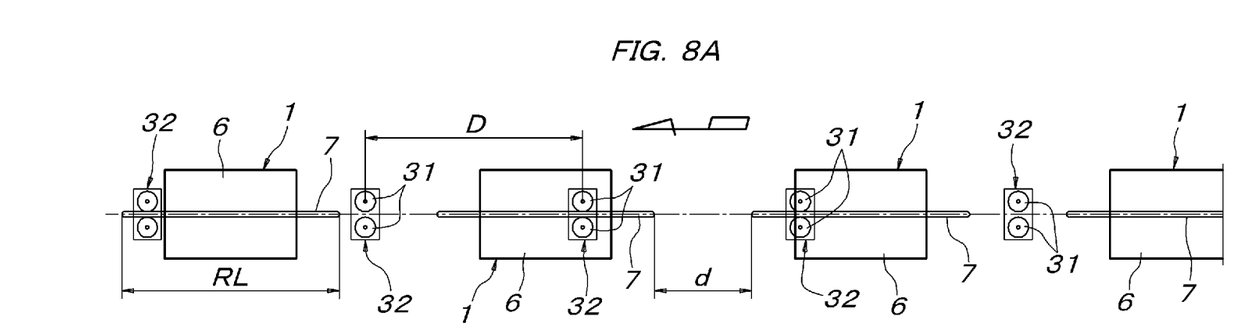
FIG. 8A to FIG. 8C are schematic plan views for describing various states of travel by friction drive of conveying traveling bodies.
Figure 8B:
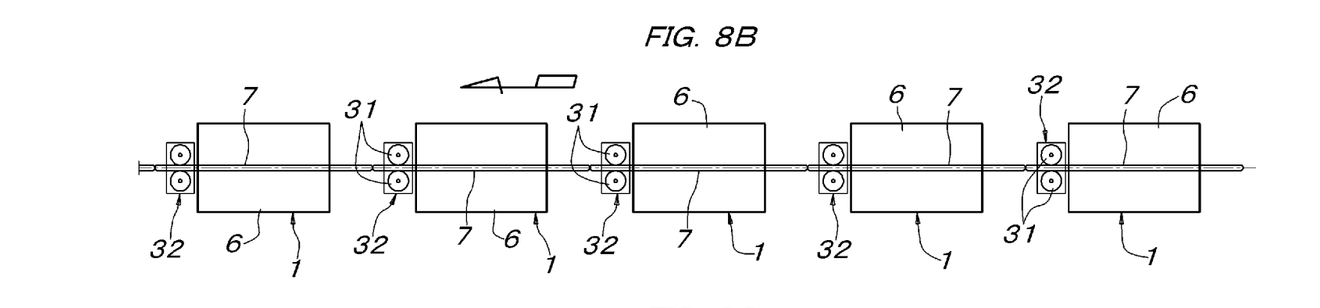

As a friction drive means for driving each conveying traveling body 1 to travel forward, a friction drive means 32, including friction drive wheels 31 that are motor-driven in a state of being in pressure contact with the load bar 7 by spring forces as indicated by virtual lines in FIG. 3 and shown schematically in FIG. 8A to FIG. 9B, is used, and as the friction drive means 32, a conventionally well-known configuration where a pair of right and left friction drive wheels 31 are provided so as to sandwich the load bar 7 from the respective right and left sides, or configuration where a single friction drive wheel 31 that pressure contacts just one side of the load bar 7, or configuration where the load bar 7 is sandwiched by a friction drive wheel 31 and a freely rotatable backup roller, etc., may be used. By installing the friction drive means 32 as shown in FIG. 8A and FIG. 8B along the travel path of the conveying traveling bodies 1 at intervals D not longer than the total length RL of the load bar 7 of each conveying traveling body 1 and driving the friction drive wheels 31 of the respective friction drive means 32 to rotate at the same speed, the respective conveying traveling bodies 1 can be made to travel forward at the same speed in a state of maintaining an arbitrary interval d between load bars 7 as shown in FIG. 8A or the respective conveying traveling bodies 1 can be made to travel forward in the connected state in which the load bars 7 are abutted against each other as shown in FIG. 8B. When the conveying traveling bodies 1 are made to travel forward in the states shown in FIG. 8A and FIG. 8B, the linking hook 8 of each conveying traveling body 1 is switched to the non-functioning standby orientation.

Figure 8C:
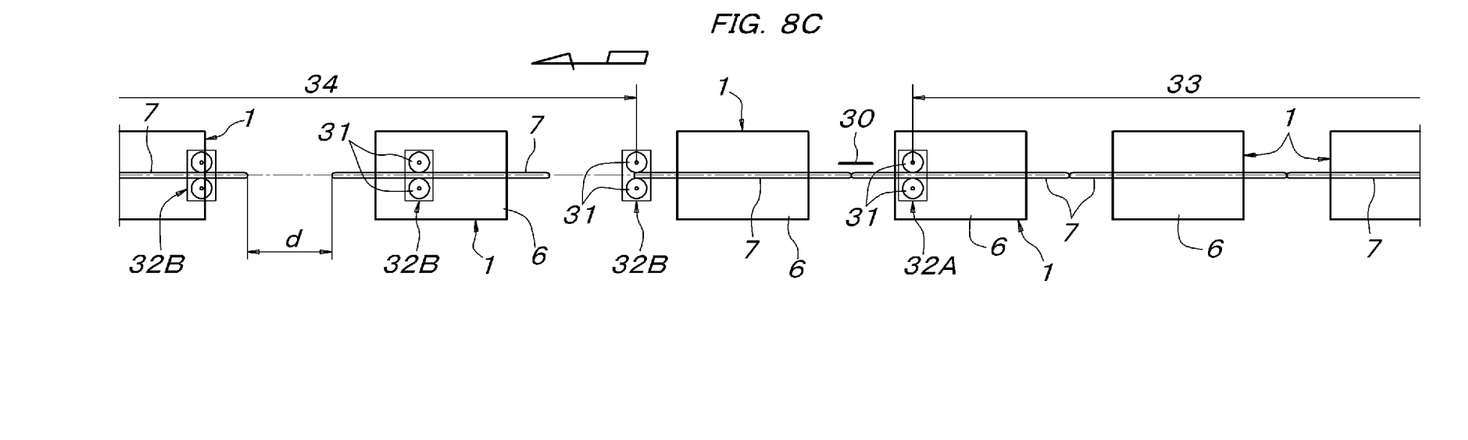

FIG. 8C shows a storage region 33 of the conveying traveling bodies 1 followed by a high-speed travel region 34. In the storage region 33, low-speed drive friction drive means 32A are respectively disposed at an unillustrated entrance part and an illustrated exit part, and in the high-speed travel region 34, high-speed drive friction drive means 32B are disposed at the interval D. With the present configuration, each conveying traveling body 1, which has been sent inside the storage region 33 by the friction drive means for low speed drive at the entrance of the storage region 33, is sequentially sent inside the storage region 33 by being pushed from the rear and driven via the load bar 7 by a conveying traveling body 1 at the rear side that is sent inside the storage region 33 by the low-speed drive friction drive means 32A at the entrance, and therefore, inside the storage region 33, the respective conveying traveling bodies 1 are made to travel forward integrally at a low speed in the connected state where the load bars 7 thereof are abutted against each other. After a state is entered in which the conveying traveling bodies 1 have thus been sent inside the storage region 33 until the low-speed drive friction drive means 32A at the exit is reached, the low-speed drive friction drive means 32A disposed at the exit is put in operation as necessary to perform sending-out at the low speed to the subsequent high-speed travel region 34 and, at the same time, the conveying traveling bodies 1 are sent in by rear-pushing drive from the entrance side to constantly maintain a state where the conveying traveling bodies 1 are stored closely in an entirety of the interior of the storage region 33. Inside the high-speed travel region 34, the respective conveying traveling bodies 1 can be made to travel forward at a fixed high speed, in a state of maintaining an arbitrary interval between the load bars 7, by the high-speed drive friction drive means 32B.

Although even in such a mode of use in the storage region 33, the linking hook 8 of each conveying traveling body 1 is basically switched to the standby orientation in which it does not function as a means for linking conveying traveling bodies 1 to each other, if a friction drive means for sending in conveying traveling bodies at the entrance of the storage region 33 malfunctions, it will not be possible to send out the conveying traveling bodies 1 inside the storage region 33 by the low-speed drive friction drive means 32A at the exit. In order to be able to accommodate such a situation, the linking hook operating rail 30 may be juxtaposed to the entrance of the storage region 33 and the linking hook 8 of each conveying traveling body 1 that is sent inside the storage region 33 may be moved upward once from the standby orientation to the pre-engagement orientation and thereafter moved downward and switched to the engaged orientation of covering the linked part 9 of the conveying traveling body 1 at the rear side. In this case, during normal operation, the conveying traveling body 1 at the rear side pushes and moves the conveying traveling body 1 at the front side from the rear by the abutting of the load bars 7 against each other and therefore, basically, the linking hook 8 is simply in the engaged orientation without a load acting thereon.

Although by using in such a manner, when a situation such as the above occurs, all conveying traveling bodies 1 inside the storage region 33 can be pulled out by the low-speed drive friction drive means 32A at the exit of the storage region 33 in the state where each conveying traveling body 1 at the rear side is towed, via its linked part 9, by the linking hook 8 in the engaged state of the conveying traveling body 1 at the front side, when the high-speed travel region 34, in which travel is performed with the required interval being set between the conveying traveling bodies 1 (between the load bars 7), is connected to the storage region 33, it is preferable, as illustrated, to make an interval from the low-speed drive friction drive means 32A at the exit of the storage region 33 to the high-speed drive friction drive means 32B at the entrance of the subsequent high-speed travel region 34 longer than the total length of the load bar 7 and configure so that before a conveying traveling body 1B, which is driven by being pushed from the rear by a conveying traveling body 1A that is sent out by the low-speed drive friction drive means 32A at the exit of the storage region 33, reaches the high-speed drive friction drive means 32B at the entrance of the high-speed travel region 34, the linking hook 8 of the conveying traveling body 1B is switched to the pre-engagement orientation by the linking hook operating rail 30 and so that after the conveying traveling body 1B reaches the high-speed drive friction drive means 32B at the entrance of the high-speed travel region 34 and is driven at high speed so that the conveying traveling body 1B separates to the front from the conveying traveling body 1A in the state where the linking hook 8 of the conveying traveling body 1B is in the pre-engagement orientation, the linking hook 8 of the conveying traveling body 1B separates from the linking hook operating rail 30 and returns to the original standby orientation.

Figure 9A:
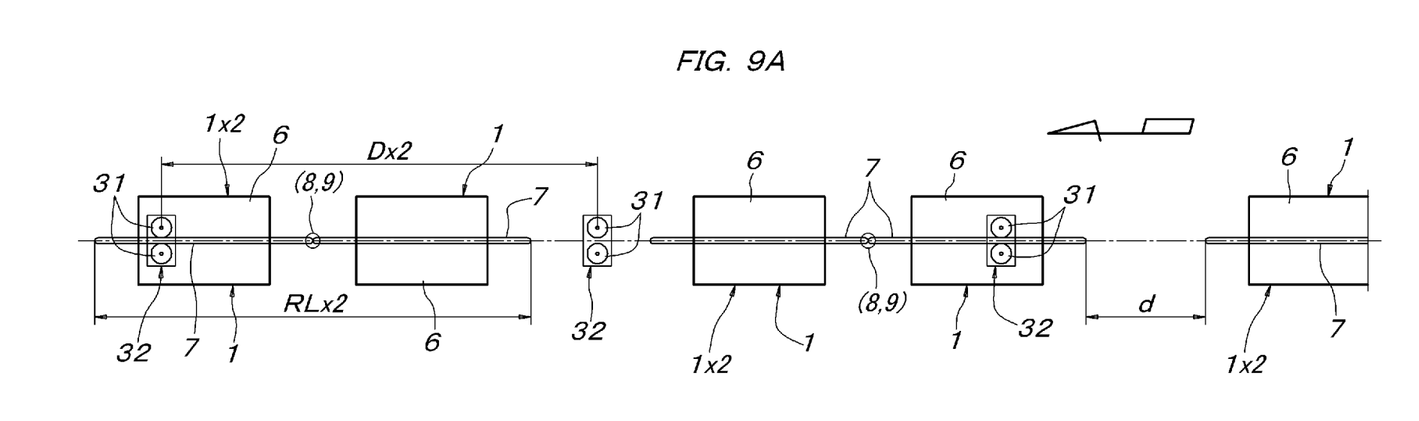
FIG. 9A and FIG. 9B are schematic plan views for describing cases where a plurality of conveying traveling bodies are linked and made to travel.
Figure 9B:
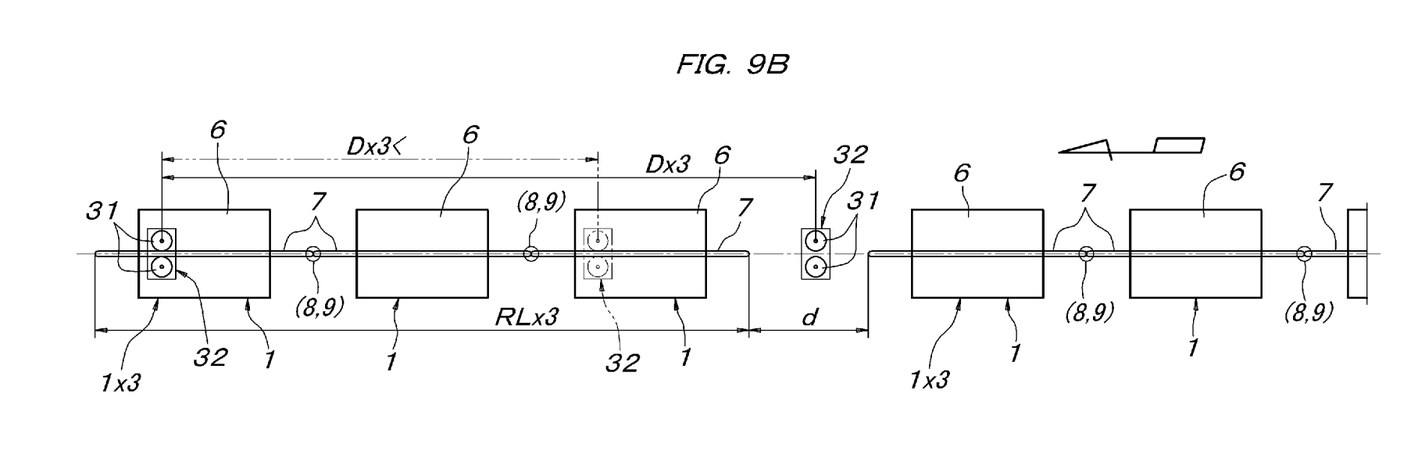

FIG. 9A and FIG. 9B illustrate embodiments where a plurality of the conveying traveling bodies 1 are linked and made integral by the linking means (8, 9), each constituted of the linking hook 8 and the linked part 9, and enabled to be friction-driven as a single conveying traveling body of long length. That is, in FIG. 9A, two conveying traveling bodies 1 are linked and made integral as a linked conveying traveling body 1×2 by the linking means (8, 9) and a configuration is made so that such linked conveying traveling bodies 1×2 can be friction-driven, while maintaining an arbitrary interval, by the friction drive means 32 aligned at intervals D×2 that are not longer than a total length (total length of two front and rear load bars 7) RL×2 of the linked conveying traveling body 1×2. Also, in FIG. 9B, three conveying traveling bodies 1 are linked and made integral as a linked conveying traveling body 1×3 by the linking means (8, 9) and a configuration is made so that such linked conveying traveling bodies 1×3 can be friction-driven, while maintaining an arbitrary interval, by the friction drive means 32 aligned at intervals D×3 that are not longer than a total length (total length of three front and rear load bars 7) RL×3 of the linked conveying traveling body 1×3. In such cases where a plurality of conveying traveling bodies 1 are linked and made integral by the linking means (8, 9), the linking hook operating rail 30, shown in FIG. 6A to FIG. 7, is used to make the respective conveying traveling bodies 1 that are sent to a fixed position be sent out as the linked conveying traveling body 1×2 or 1×3 of the required number of bodies. In this case, a single linking hook operating rail 30 disposed at the fixed position may be used to make conveying traveling bodies 1, in a state of being longitudinally abutted against each other, be sent out successively at a length of one conveying traveling body 1 each until the required number of conveying traveling bodies 1 are linked, or at the fixed position, linking hook operating rails 30 may be disposed so as to correspond to respective linking locations between respective conveying traveling bodies 1 when the required number of conveying traveling bodies 1 are stopped in the connected state of being abutted against each other and, after the required number of conveying traveling bodies 1 have entered the connected state of being abutted against each other at the fixed position, all of the required number of conveying traveling bodies 1 may be made to travel forward to make the linking means (8, 9) between the conveying traveling bodies 1 separate to the front from the respective linking hook operating rails 30 and enter the linked state automatically.

Among the conveying traveling bodies 1 configuring the linked conveying traveling bodies 1×2 and 1×3 in the embodiments illustrated in FIG. 9A and FIG. 9B, the conveying traveling body 1 that is positioned further to the rear than the conveying traveling body 1 friction-driven by the friction drive means 32 is towed via the linking means (8, 9) by the conveying traveling body 1 at the front side and the conveying traveling body 1 that is positioned further to the front than the conveying traveling body 1 friction-driven by the friction drive means 32 is driven by being pushed from the rear via the load bar 7 by the conveying traveling body 1 at the rear side. Therefore, when the number of conveying traveling bodies 1 that are towed via the linking means (8, 9) becomes large, the load acting on the linking means (8, 9) becomes large and thus, for example, in the case of the linked conveying traveling body 1×3 illustrated in FIG. 9B in which three bodies are linked, the interval Dx3 between friction drive means 32 may be narrowed to an interval Dx3<shorter than the interval Dx3 to provide a configuration where both the forefront conveying traveling body 1 of the linked conveying traveling body 1×3 and the conveying traveling body 1 at the rear are friction-driven.

The conveying-traveling-body-utilizing conveying device according to the present invention can be put to practical use in an automobile assembly line, etc., as a conveying device, which, while being capable of making a plurality of conveying traveling bodies, which are friction-driven on a fixed travel path, travel at arbitrary intervals in the state of being linked and integrated by the linking means, is also capable of easily switching the linking means to the non-functioning state to make travel be performed in the connected state where a conveying traveling body at a front side is pushed from the rear by a conveying traveling body at a rear side.

What is claimed is:

1. A conveying-traveling-body-utilizing conveying device comprising a conveying traveling body, which includes a load bar for friction drive that is continuous across its total length, and a friction drive means, which is disposed at a travel path flank and drives the conveying traveling body to travel by a friction drive wheel in pressure contact with the load bar, with the conveying traveling body being provided with a linking means, which links longitudinally adjacent conveying traveling bodies to each other in a state where the respective load bars are made continuous to each other, the linking means being constituted of a linked part, provided at one end among respective front and rear ends of the load bar, a linking hook, provided at the other end and capable of being engaged with and disengaged from the linked part of another adjacent conveying traveling body, and an operated part provided at the linking hook, and a linking hook operating rail, acting on the operated part to switch the linking hook between an engaged orientation and a non-engaged orientation with respect to the linked part, being disposed along the travel path to a side of the conveying travel body, and the linking hook is pivotally supported so as to be vertically movable between a pre-engagement orientation of being separated upward from the linked part of the other adjacent conveying traveling body with respect to the engaged orientation of covering the linked part from above, and a standby orientation of being tilted to a lowering limit from the engaged orientation by an urging force, and, when the linking hook is in the standby orientation, longitudinally adjacent conveying traveling bodies are enabled to approach each other to a connected state, where the respective load bars are abutted against each other, without the linking hook in the standby orientation and the linked part of the other adjacent conveying traveling body contacting each other.

2. The conveying-traveling-body-utilizing conveying device according to claim 1, wherein an inverted L-shaped support member, comprising a columnar part, projecting upward from an upper surface of the load bar, and a support part, extending from an upper end of the columnar part to the side at which the engaging counterpart linking hook is present, is mounted to an end part of the load bar at which the linked part is provided and the linked part is projected at a distal upper surface side of the support part of the inverted L-shaped support member and being configured so that when, in the state where the linking hook is in the standby orientation, longitudinally adjacent conveying traveling bodies approach each other to the connected state where the respective load bars are abutted against each other, a hook part on a distal end of the linking hook in the standby orientation enters inside a space between the support part of the inverted L-shaped support member and the load bar positioned at a lower side thereof.

3. The conveying-traveling-body-utilizing conveying device according to claim 2, wherein the linking hook is pivotally supported at its rear end part, with respect to the distal end with the hook part, in a vertically movable manner by a horizontal support shaft at a columnar support member erected on an upper surface of an end part of the load bar, the columnar support member is provided with a stopper part restricting a vertical movement range of the linking hook to a range between the pre-engagement orientation and the standby orientation, and the linking hook is configured to be held in the standby orientation by gravity.

4. The conveying-traveling-body-utilizing conveying device according to claim 2, wherein the linked part of the linking means comprises a roller that is pivotally supported in a rotatable manner by a vertical support shaft at the distal upper surface side of the support part of the inverted L-shaped support member and the hook part of the linking hook is configured by installing, at an inner side of a downward projection, projecting downward from the distal end of the linking hook, a band plate with a lateral width wider than a diameter of the roller so as to protrude to both right and left sides from the downward projection.

\* \* \* \* \*